US008762834B2

(12) United States Patent
Falk et al.

(10) Patent No.: US 8,762,834 B2
(45) Date of Patent: Jun. 24, 2014

(54) USER INTERFACE FOR DEFINING A TEXT FILE TRANSFORMATION

(75) Inventors: Alexander Falk, Marblehead, MA (US); Vladislav Gavrielov, Vienna (AT)

(73) Assignee: Altova, GmbH, Vienna (AT)

( * ) Notice: Subject to any disclaimer, the term of this patent is extended or adjusted under 35 U.S.C. 154(b) by 1321 days.

(21) Appl. No.: 11/541,203

(22) Filed: Sep. 29, 2006

(65) Prior Publication Data
US 2008/0082962 A1 Apr. 3, 2008

(51) Int. Cl.
*G06F 17/00* (2006.01)
*G06F 17/24* (2006.01)
*G06F 3/048* (2013.01)

(52) U.S. Cl.
CPC ............... *G06F 17/24* (2013.01); *G06F 3/048* (2013.01)
USPC ........... 715/255; 715/234; 715/256; 715/810; 715/853; 717/113; 717/144

(58) Field of Classification Search
CPC .................................. G06F 17/24; G06F 3/048
USPC ................. 715/700, 810, 234, 255, 256, 853; 717/113, 144
See application file for complete search history.

(56) References Cited

U.S. PATENT DOCUMENTS

| 5,903,858 | A  | * | 5/1999  | Saraki .............................. 704/4    |
|-----------|----|---|---------|------------------------------------------------|
| 6,092,091 | A  | * | 7/2000  | Sumita et al. ................. 715/209        |
| 6,587,124 | B1 | * | 7/2003  | Slaby ............................. 715/735    |
| 6,661,437 | B1 | * | 12/2003 | Miller et al. .................. 715/810       |
| 6,792,595 | B1 | * | 9/2004  | Storistenau et al. .......... 717/110          |
| 6,820,094 | B1 | * | 11/2004 | Ferguson et al. ............. 707/200          |
| 6,823,495 | B1 | * | 11/2004 | Vedula et al. ................. 715/805        |
| 7,499,943 | B2 | * | 3/2009  | Hobbs .................................... 1/1 |
| 7,509,572 | B1 | * | 3/2009  | Melander et al. ............. 715/234           |
| 7,536,711 | B2 | * | 5/2009  | Miyashita et al. ................ 726/3         |
| 7,593,846 | B2 | * | 9/2009  | Ramsey et al. .................. 704/10         |
| 7,620,937 | B2 | * | 11/2009 | Narayana et al. ............. 717/124           |
| 7,797,661 | B2 | * | 9/2010  | Cox et al. ...................... 716/111       |
| 7,840,574 | B2 | * | 11/2010 | Hobbs ........................... 707/752       |
| 7,987,427 | B1 | * | 7/2011  | Gough et al. .................. 715/762         |
| 8,032,827 | B2 | * | 10/2011 | Melander et al. ............. 715/234           |
| 8,091,036 | B1 | * | 1/2012  | Pavek et al. ................... 715/762        |
| 8,140,323 | B2 | * | 3/2012  | Johnson et al. .................. 704/9         |
| 8,307,012 | B2 | * | 11/2012 | Thomas ........................ 707/803         |

(Continued)

OTHER PUBLICATIONS

Nishant, P and Meena, Chandra, XML Editor for Indian Languages, Nov. 2002, Indian Institute of Technology Kanpur, www.cse.iitk.ac.in/report-repository/2003/btp_97237_97103.pdf.*

(Continued)

*Primary Examiner* — Cesar Paula
*Assistant Examiner* — David Faber
(74) *Attorney, Agent, or Firm* — Chapin IP Law

(57) ABSTRACT

Methods and apparatus, including computer program products, for a user interface for defining a text file transformation. A method of processing a text file includes retrieving the text file, displaying the text file and a tree structure showing processing commands, and performing a set of visual editing operations to extract given portions of the text file while discarding other text, characters or white space, the displayed tree structure updated to include all processing commands representative of the visual editing operations. The method can include previewing the results of and/or debugging the editing operations using the displayed processing commands in the tree structure.

38 Claims, 11 Drawing Sheets

(56) References Cited

U.S. PATENT DOCUMENTS

| | | | |
|---|---|---|---|
| 8,489,984 B1* | 7/2013 | Violet et al. | 715/243 |
| 2002/0129059 A1* | 9/2002 | Eck | 707/513 |
| 2003/0145279 A1* | 7/2003 | Bourbakis et al. | 715/511 |
| 2003/0237046 A1* | 12/2003 | Parker et al. | 715/513 |
| 2004/0064791 A1* | 4/2004 | Hattori et al. | 715/517 |
| 2004/0162833 A1* | 8/2004 | Jones et al. | 707/100 |
| 2004/0268304 A1* | 12/2004 | Kuo et al. | 717/109 |
| 2005/0021513 A1* | 1/2005 | Vedula et al. | 707/3 |
| 2005/0060324 A1* | 3/2005 | Johnson et al. | 707/100 |
| 2005/0114368 A1* | 5/2005 | Gould et al. | 707/100 |
| 2005/0177788 A1* | 8/2005 | Snyder | 715/523 |
| 2005/0256893 A1* | 11/2005 | Perry | 707/101 |
| 2005/0257193 A1* | 11/2005 | Falk et al. | 717/109 |
| 2005/0267907 A1* | 12/2005 | Pope et al. | 707/100 |
| 2006/0218507 A1* | 9/2006 | K et al. | 715/810 |
| 2006/0259456 A1* | 11/2006 | Falk et al. | 707/2 |
| 2007/0178501 A1* | 8/2007 | Rabinowitz et al. | 435/6 |
| 2009/0070667 A1* | 3/2009 | Zlatanov et al. | 715/243 |
| 2009/0150364 A1* | 6/2009 | Melander et al. | 707/3 |

OTHER PUBLICATIONS

Altova, "Altova MapForce 2006", Altova, published early as Jun. 16, 2006, pp http://web.archive.org/web/20060615211710/http://www.altova.com/products/mapforce/data_mapping.html.*

* cited by examiner

US 8,762,834 B2

USER INTERFACE FOR DEFINING A TEXT FILE TRANSFORMATION

BACKGROUND

The present invention relates to data processing by digital computer, and more particularly to a user interface (UI) for defining a text file transformation.

Organizations today are realizing substantial business efficiencies in the development of data intense, connected, software applications, which provide seamless access to database systems within large corporations, as well as externally linking business partners and customers alike. Such distributed and integrated data systems are a necessary requirement for realizing and benefiting from automated business processes, yet this goal has proven to be elusive in real world deployments for a number of reasons, including the myriad of different database systems and programming languages involved in integrating today's enterprise back-end systems Internet technologies in particular have given organizations an ability to share information in real-time with customers, partners, and internal business units. These entities, however, often store and exchange data in dissimilar formats, such as Extensible Markup Language (XML), databases, and legacy Electronic Data Interchange (EDI) systems. Long before EDI and XML applications became commonplace, text files have been used as a way to exchange data between applications and computer systems. Today, businesses employ legacy software that can no longer be modified, but produces useful output in the form of text files or requires input in such form. Integrating these legacy applications into a modern computing environment can be challenging. The structure of flat files and text documents varies from application to application, making processing and integrating legacy data with other structured data formats difficult. Often these files may be produced by reporting tools and contain formatting that makes data reuse difficult, without extracting relevant portions of data. At other times, it may no longer be possible to update the software that processes such legacy files, and hence even newer software must produce files in the old legacy format.

SUMMARY

The present invention provides methods and apparatus, including computer program products, for a user interface for defining a text file transformation.

In general, in one aspect, the invention features a method of processing a text file including retrieving the text file, displaying the text file and a tree structure showing processing commands, and performing a set of visual editing operations to extract given portions of the text file while discarding other text, characters or white space, the displayed tree structure updated to include all processing commands representative of the visual editing operations.

In embodiments, the method can include previewing results of the editing operations using the displayed processing commands in the tree structure. The method can include debugging the editing operations using displayed processing commands in the tree structure.

The set of visual editing operations can include a first operation that splits off a fragment of the text file. The set of visual editing operations can include second operation that splits off repeating fragments of the text file. The set of visual editing operations can include a third operation that identifies a fragment of the text file that can be to be ignored.

The set of visual editing operations can include a fourth operation that identifies a fragment of the text file as belonging to a given data hierarchy. The set of visual editing operations can include a fifth operation that enables a set of one or more conditions to be associated with a given fragment of the text file. The set of visual editing operations can include a sixth operation that enables a fragment of the text file to be extracted in a given format. The given format can be one of comma separated value (CSV) or fixed length field (FLF).

The set of visual editing operations can include a seventh operation that associates a fragment of the text file as a mapable object.

The displayed tree structure of processing commands can be stored in a template or configuration file. The template or configuration file can be used in a mapping tool to input text files according to a defined structure. The template or configuration file can be used in a mapping tool to output text files according to a defined structure.

The template or configuration file can be used to convert an input text file into a structured output document. The structured output document can be an XML document.

In another aspect, the invention features a data processing system including a graphical user interface (GUI) enabling interactive visual restructuring of a displayed text file into a modified text file with a set of visual editing commands while concurrently displaying a tree structure including processing commands representative of the editing commands.

In embodiments, the set of visual editing operations can include an operation that creates a fragment from the text file. The set of visual editing operations can include an operation that creates repeated fragments from the text file. The set of visual editing operations can include an operation that identifies given characters in the text file to be excluded from the modified text file.

The set of visual editing operations can include an operation that reformats a given fragment from the text file for use in a hierarchical data representation. The set of visual editing operations can include an operation that associates multiple conditions to a block of text in the text file.

The set of visual editing operations can include an operation that extracts data from the text file in a comma separate value format. The set of visual editing operations can include an operation that extracts data from the text file in a fixed length field format.

The graphical interface can include a display portion in which an aggregate representation of the visual editing operations can be displayed.

In another aspect, the invention features a method of processing a text file including retrieving the text file, displaying the text file and a tree structure showing processing commands, performing a set of visual editing operations to extract given portions of the text file while discarding other text, characters or white space, the displayed tree structure updated to include all processing commands representative of the visual editing operations, and previewing results of and/or debugging the editing operations using the displayed processing commands in the tree structure.

In embodiments, the displayed tree structure of processing commands can be stored in a template or configuration file. The template or configuration file can be used in a mapping tool to input or output text files according to a defined structure.

The template or configuration file can be used to convert an input text file into a structured output document. The structured output document can be an XML document.

The set of visual editing operations can include a first operation that splits off a fragment of the text file. The set of visual editing operations can include second operation that splits off repeating fragments of the text file. The set of visual editing operations can include a third operation that identifies a fragment of the text file to be ignored.

The set of visual editing operations can include a fourth operation that identifies a fragment of the text file as belonging to a given data hierarchy. The set of visual editing operations can include a fifth operation that enables a set of one or more conditions to be associated with a given fragment of the text file. The set of visual editing operations can include a sixth operation that enables a fragment of the text file to be extracted in a given format. The given format can be one of comma separated value (CSV) or fixed length field (FLF).

The set of visual editing operations can include a seventh operation that associates a fragment of the text file as a mapable object.

The invention can be implemented to realize one or more of the following advantages.

A design tool enables an information developer to generate a flat file template in a visual manner using a set of configurable operations to extract, fragment, mark up and/or re-format given portions of a text file while ignoring other non-relevant text, characters or white space.

All processing commands that are used to parse a text file are shown in a tree structure in a graphical user interface (GUI). Rather than merely building a tree structure out of text, all commands are displayed in a tree structure. A user can visually find and correct text processing at the time when it is generated and also afterwards with the same ease.

The visual presentation of the GUI enables a user to see and debug processing "on the fly," i.e., step from one block to another and visually see the impact of such steps, without having to start a formal debugger.

A design tool is easy to use, as each of the configurable operations is enabled using a simple object-oriented "container" construct. As a developer moves through a transformation, an overview display pane provides a view of the overall design. The interface provides an intuitive and powerful means for generating a set of one or more rules that define the text file transformation. A resulting template can then be processed by the mapping tool directly, or by first being transformed into a set of one or more external files.

Once such template has been defined in the design tool, in addition to parsing existing legacy text files according to the template and using the data from these texts files in the mapping too, the same template can be used by the mapping tool to output text files in the legacy format. This enables the user to generate a bi-directional template to describe legacy text files for both input and output operations in the mapping tool in a single step.

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
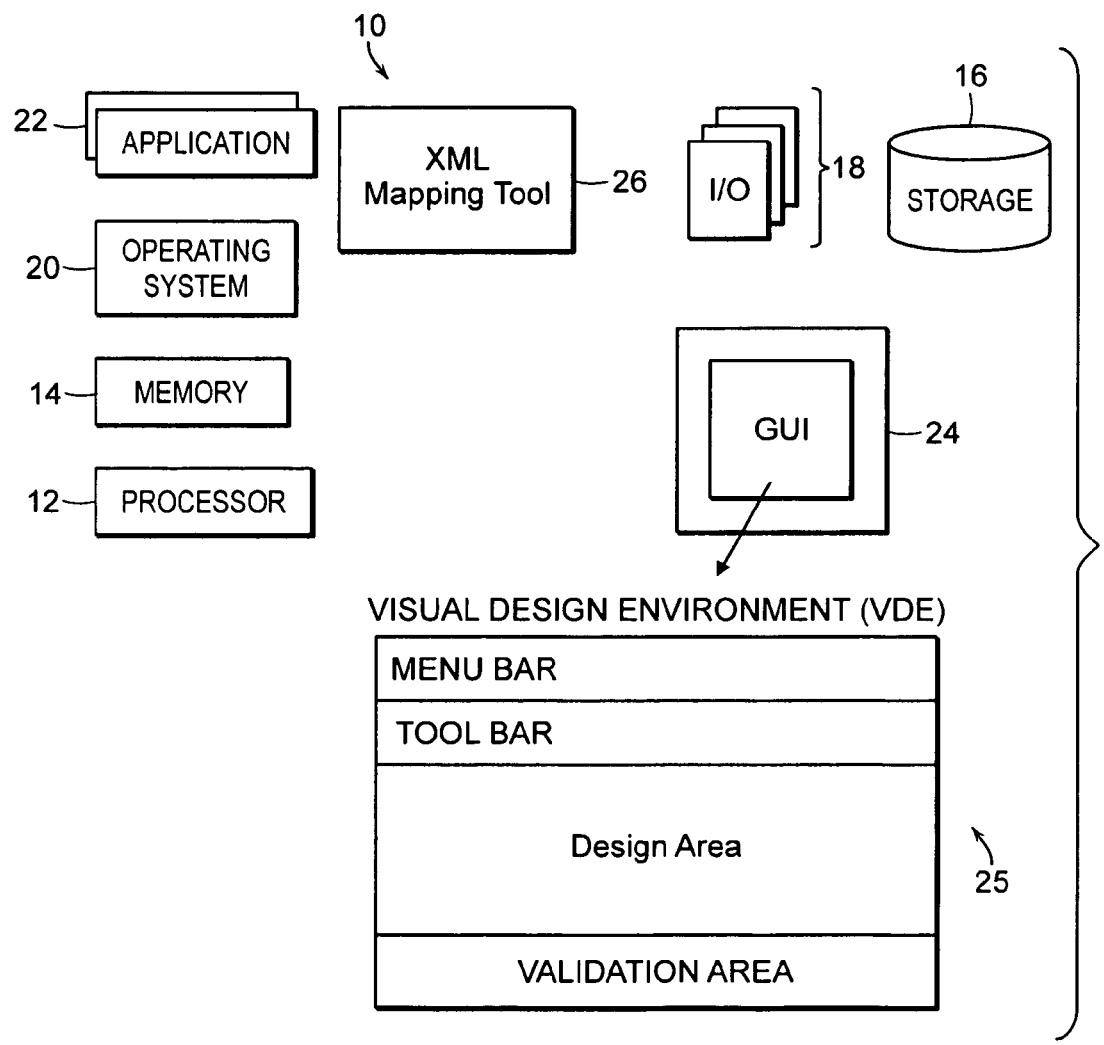
FIG. 1 is a block diagram of an exemplary data processing system.

As shown in FIG. 1, an exemplary data processing system 10 is a computer having one or more processors 12, suitable memory 14 and storage devices 16, input/output devices 18, an operating system 20, and one or more applications 22. One input device is a display 24 that supports a window-based graphical user interface (GUI). The data processing system 10 includes suitable hardware and software components to facilitate connectivity of the system 10 to the public Internet, a private intranet or other computer network(s). In a particular example, the data processing system 10 is a computer executing a suitable operating system, such as Microsoft Windows® or Linux.

The data processing system 10 includes a display 24 having a graphical user interface (GUI) that outputs a visual design environment (VDE) 25, together with an Extensible Markup Language (XML) data integration tool 26. One example XML data integration tool 26 is MapForce® from Altova GmbH. MapForce® provides a design interface for mapping between pairs of data representations (e.g., between XML, EDI or database data, and XML and/or databases), and may auto-generate mapping code for use in custom data integration applications. An integration tool of this type enables an entity to map its internal data representations into formats that match those of third parties, and may include ancillary technology components such as an XML parser, an interpreter engine, an XSLT processor, and so forth. These ancillary technology components may be provided as native applications within the XML tool or as downloadable components.

Here, a data integration tool is enhanced by providing a graphical utility for parsing structured text files and, in particular, for generating rules for a flat file template in a visual manner. The resulting text file transformation can then be incorporated into a mapping.

Figure 2:
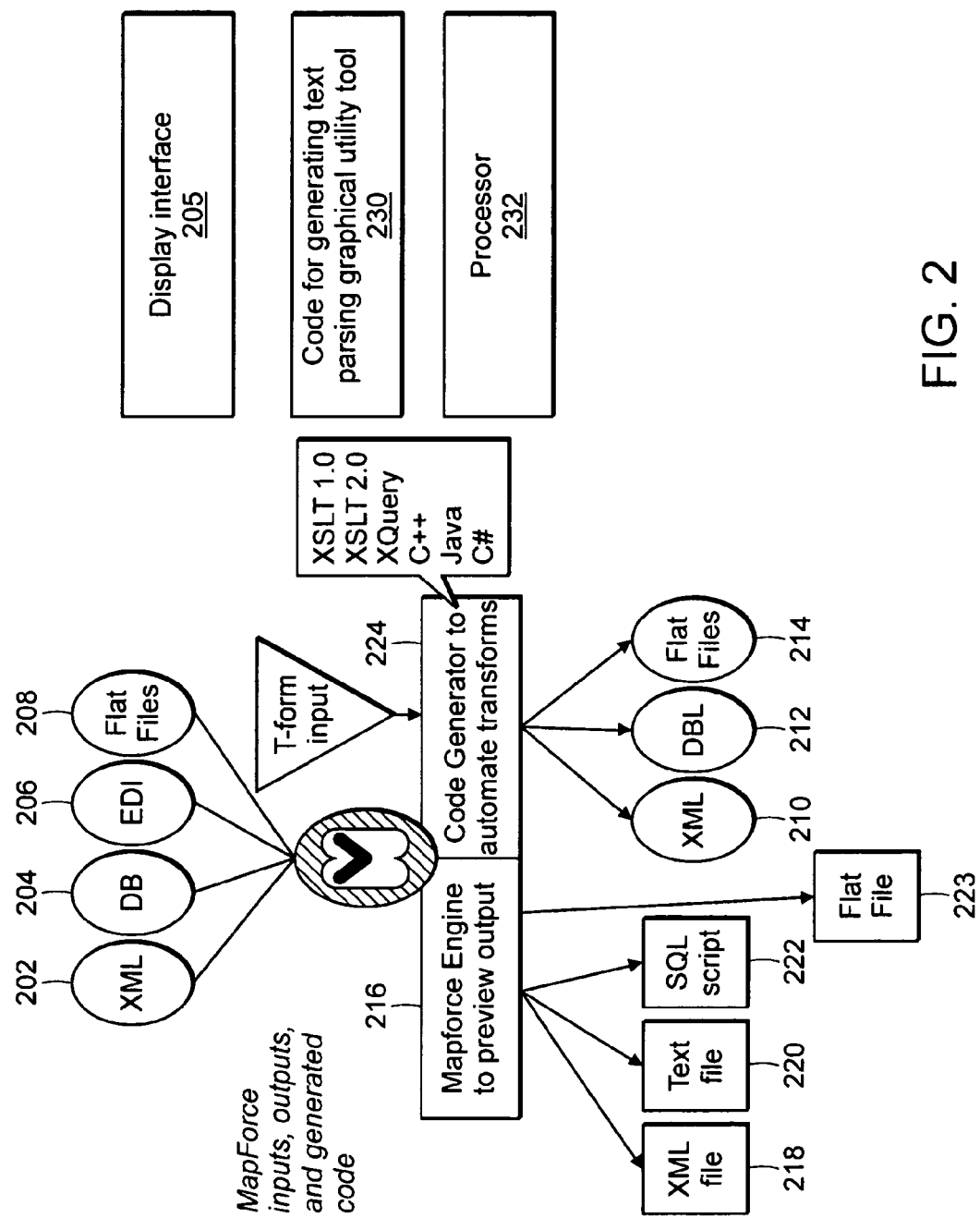
FIG. 2 is a data integration tool modified to enable graphical utility text file parsing support.

FIG. 2 illustrates a high level functionality of a data integration tool. An exemplary tool provides a display interface 205 for mapping any combination of XML 202, database 204, EDI 206 or flat file 208, to XML 210, databases 212 or flat files 214. The tool may also include given software code (e.g., a set of instructions) that functions as an engine 216 for previewing outputs, such as an XML file 218, a text file 220, an SQL script 222, or a flat file 223. A code generator 224 auto-generates mapping code 226 for use in custom data integration applications. The display interface 205, preview engine 216 and code generator 224 functions are described in co-pending U.S. patent application Ser. No. 10/844,985, titled "METHOD AND SYSTEM FOR VISUAL DATA MAPPING AND CODE GENERATION TO SUPPORT DATA INTEGRATION," the disclosure of which is incorporated herein by reference. As a mapping is being developed, and as described in U.S. patent application Ser. No. 10/844,985, a system may also provide a library of data processing functions for filtering data based on Boolean conditions or manipulating data between a source and a target. Once the data mappings and data processing functions are defined, the data integration tool auto-generates the software program code to marshal data from the source to the target content model for use in a customized data integration application. Using auto-generated code ensures compatibility and interoperability across different platforms, servers, programming languages and database environments. As also described in patent application Ser. No. 10/844,985, preferably the engine enables execution and viewing of the output of a mapping at any time.

As is fully described below, the present invention may be implemented in a data integration tool of this type. In particular, and with reference to FIG. 2, a data integration tool includes code 230 executable by a processor 232 for generating a graphical utility for use in parsing structured text files so that the data can be integrated with XML, databases, EDI and other flat file data, e.g., in Web services, data integration applications, and so forth.

A text data file format upon which the graphical utility operates typically is a collection of data records having minimal or no structure. A text data file may be simple or complex. Examples of simple text files include binary data, text files, flat files, CSV values, tab-separated files, and so forth. The graphical utility is not limited to use with any particular text file format, but rather provides an extensible solution for any text file format in any given character set, encoding or language. Information in the flat file usually is expressed in the form of a character string.

According to a feature of the present invention, a user interface (UI) tool is provided to enable a user to define flexible text file transformations directly, e.g., by visually pointing to elements in a text file and having one or more such external files generated automatically. The tool provides a graphical interface that enables the user to process complex files that often contain multiple delimiters, nested in-line structures and other complexities. The tool provides a graphical template that (e.g., in the form of the external files) may then be loaded in the mapping tool, where the individual items can be mapped to any type of target component. The template operates on a text file that is supplied or opened in the mapping tool. This enables the user to reuse the same template for multiple text files and in multiple mappings.

All processing commands are shown in a tree structure in the UI. More specifically, rather than merely building a tree structure out of text, here all commands are displayed in a tree structure. Many methods show separate displays of original text partially marked and a tree structure apart. These methods require a user to click into text or into tree structure in order to understand how they correspond to each other. This becomes difficult to understand after work is complete the commands are not visually displayed. In our method, the user can visually find and correct text processing at the time when it is generated and also afterwards with the same ease.

Our UI enables a user to see and debug processing "on the fly," i.e., step from one block to another and visually see the impact of such steps, without having to start a debugger.

The graphical utility is a tool that enables the user to generate rules for a flat file template in a visual manner. When the user opens a flat file in the interface, preferably the file is displayed in two blocks. A root block represents the original file, while an adjacent operation block displays the data of the file as the user performs operations to extract, or split out, the data needed. The user can change the names of these blocks as desired. Preferably, the result of each operation is visible in real time, so that the user can immediately see if a desired result has been achieved. Moreover, with each operation, the user can view the sample text that is generated in either a sample text window at the bottom of a design pane or in a box next to the operation itself. As the user is working, an overview window helps the user visualize and navigate through the different operations performed on the file.

Generally, the interface enables the user to isolate the data he or she needs to access by removing non-relevant text, characters, and white space. This will usually be accomplished by using a configurable (preferably menu-driven) "split" command. Each split preferably presents the data in two new blocks: one block that contains the data split out and another that has new contents of the file. In this manner, the user can immediately see the result of each operation performed on the file. After the split and other configuration options are applied, a modified or altered text file remains, typically without superfluous information. This modified or altered text file is the file from which the external files can then be generated. Splitting a text file can be performed both horizontally and vertically. Furthermore, it is possible to split based on a certain number of rows from the top/bottom or columns from left/right, as well as to split based upon the content, e.g., when a certain text is found.

Preferably, both "split once" and "repeated split" operations are available. The split once command helps the user identify, tag, extract, or remove lines that only occur once in the file, while the repeated split mode enables the user to identify repeating sections of information so that he or she can extract the data contained in each section. In addition to splitting data, the tool supports "ignore" and "node" operations for further flexibility in constructing the information tree that is desired to be exposed to a mapping interface. An ignore operation marks a block of text as irrelevant for mapping purposes. A node operation generates a new node in an XML information tree so that the designer can properly represent any hierarchical nature of the data when needed. Further, to extract content in different ways depending on information stored in the file, the tool provides for a "switch" operation, which enables the user to define multiple conditions for a single block of text. If data in the flat file meets a condition, it is passed to an associated display container for use in a mapping. If data does not meet a given condition, preferably it is forwarded to a default display container.

Often, legacy text files contain useful data in CSV (comma separated value) or FLF (fixed length field) format embedded inside a more complex flat file format. To make the extraction process easier, the graphical tool provides the user the ability to directly extract such data, e.g., using CSV and FLF operations. Once the relevant portions of the text file have been extracted, e.g., using split and other operations as described, the user can store the remaining CSV- or FLF-formatted fields by configuring field names, lengths, and other attributes.

Figure 3:
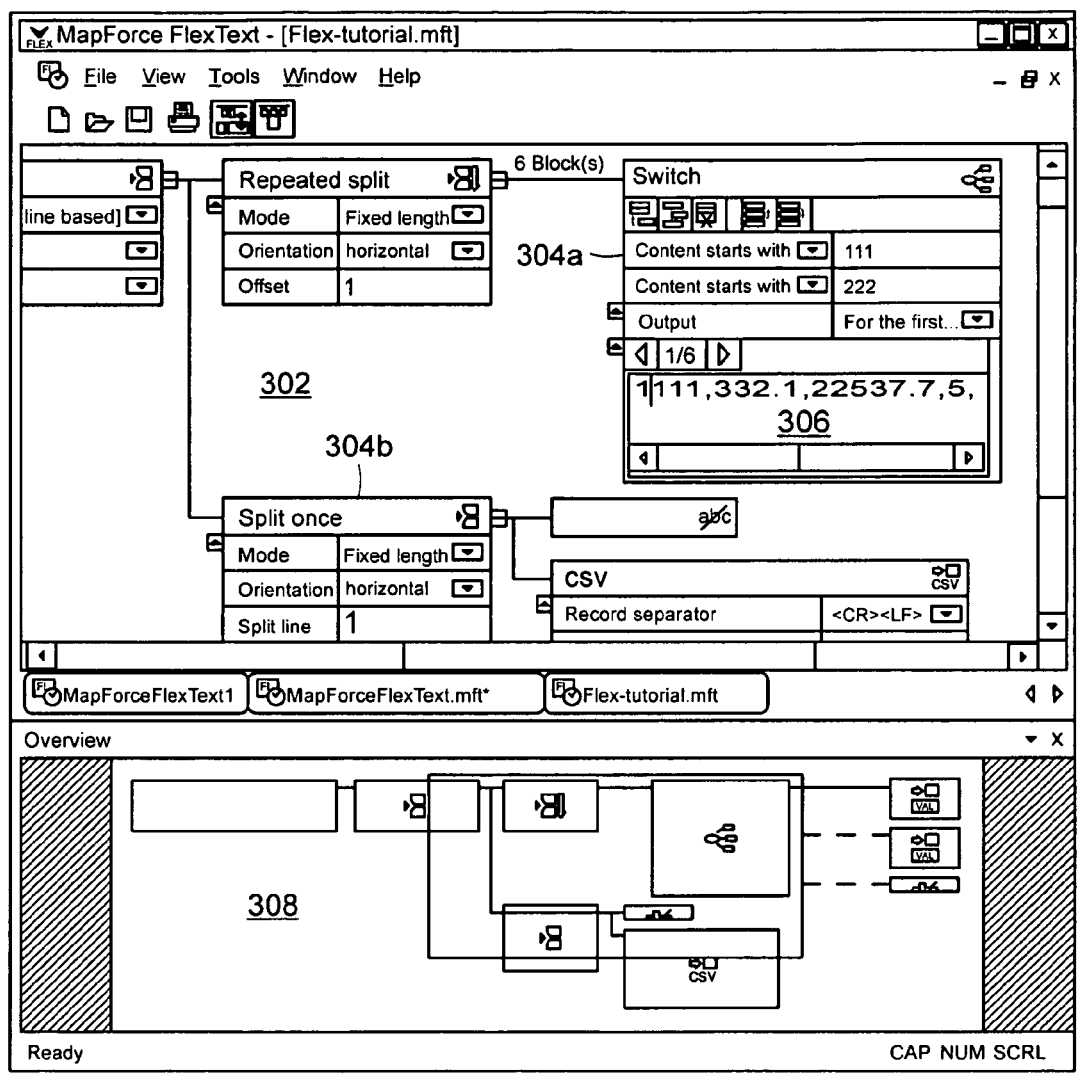
FIG. 3 is a diagram of an exemplary graphical user interface including a set of exemplary display panes.

The graphical tool enables the user to define the structure of the flat file interactively and, in a preferred embodiment, to obtain immediate feedback. Referring now to FIG. 3, a graphical interface 300 includes three main display panes, i.e., design, overview and sample text. A design pane 302 contains one or more text fragment containers 304a-n, preferably with default names describing their function, e.g., repeated split, split once, or the like, as will be explained below. A sample text pane 306 displays the contents of a currently active container. An overview 308 pane gives a birds-eye view of all the containers in the design pane 302. Containers have clickable container icons, which enable the user to define the type and content of the container.

Figure 4:
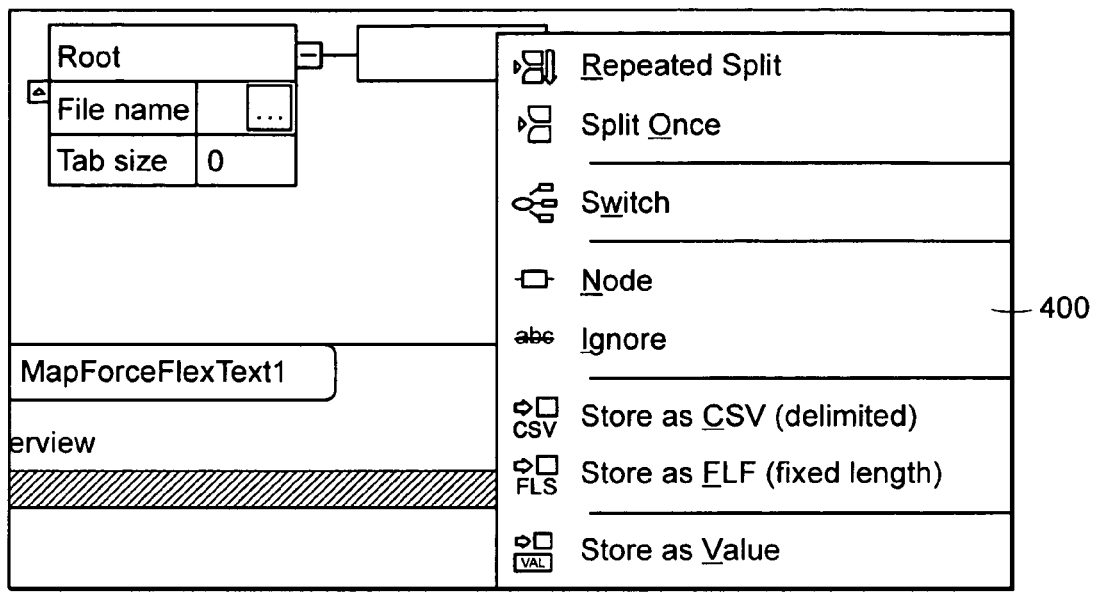
FIG. 4 illustrates how clicking a container icon opens a container object menu from which the user can select a container type.

As illustrated in FIG. 4, clicking a container icon opens a container object menu 400 from which the user can select a container type, namely, split once, split repeated, switch, node, ignore, store as CSV, store as FLF, or store as value. Each of these options define a given extracting and/or editing function that enables the user to refine the ultimate content to be exported (preferably in the form of the external files) to a target mapping component.

The following summarizes the operation of each container tool as described in the container object menu 400.

The split once option generates two containers, preferably vertically-aligned. A top container contains the text defined by a condition set in a split once container. A bottom container contains the rest of the text file/fragment. When this option is first selected, default parameters are automatically set and the resultant fragments appear in both containers. An orientation setting enables the user to define how the text fragment is to be split, by lines/records, or columns. If "horizontal" is selected, the command splits the fragment into two horizontal sections. If "vertical" is selected, the text fragment is split into two vertical columns. A "split" line parameter defines the number of lines after which the fragment should be divided in two. A "split base" parameter defines a head, which splits by the number of split lines from the top of the block, or a tail, which splits by a number of split lines from the bottom of the block.

When a "mode" is delimited (floating) in the split once container, the default settings are separator (none) and split base (head). This generates two fragments defined by separator characters that the user enters in the separator field. Preferably, the separator characters are not included in the fragment. The first fragment is defined as the text between a first character of the file/fragment up to a last character before the separator. The second fragment is defined as the first character after the separator, up to the last character in the file/fragment. If the separator appears in the first/last position of the file/fragment, then the top container remains empty. This method is used to split off one section of a file, or fragment, where the separator is anywhere in the file/fragment. This is generally useful in files that do not contain CR or LF characters and the user wants to split the fragment into two parts, at some specific in-line location.

When a mode is delimited (line based) in the split once container, the default settings are separator (none) and split base (head). This generates two fragments defined by separator characters that the user enters in the separator field. The separator characters are included in the fragment. The first fragment is defined as all the text, up to the line container the separator. The second fragment is defined as the text, and line, including the separator up to the end of the file/fragment. If the separator appears in the first/last line, of the file/fragment, then the top container remains empty. This method is used to split a file or fragment in two, where the separator is anywhere in one of the lines. The line containing the separator is not split, but is retained whole. This operation is generally useful in files containing record delimiters (CR/LF) and the user desires to split the fragment into two separate fragments.

The repeated split option initially generates a single container. The container contains the text defined by a condition set in the repeated split operation. When the option is first selected, default parameters are automatically set and the resultant fragments appear in the associated container. When a repeated split container is currently active, the preview displays all current records/lines in an associated sample text pane. As a result of the default settings, each line of text appears as a line/record in a new container. A user may click the new container to preview its contents. Sample text scroll arrows enable the user to scroll through each of the blocks/fragments produced by these settings. The orientation enables the user to define how the text fragment is to be split, namely, by lines/records, or by columns. If "horizontal" is selected, the command splits the fragment into multiple horizontal sections. If "vertical" is selected, the text fragment is split into multiple vertical columns. Each fragment then contains the characters of the column defined by the offset width to the end of the file/fragment.

When the mode is delimited (floating) in the repeated split container, the default settings are separator (none). This generates multiple fragments defined by separator characters that the user can then enter in a separator field. The separator characters are not included in the fragment. Preferably, a block or fragment is defined as the text located between a first character (after the separator) up to a last character (before a next instance of the same separator). If the separator is not the first set of characters of the file line in the fragment, then the first fragment includes all the text up to the first instance of the separator.

If the mode is delimited (line based) in the repeated split container, the default settings are separator (none). This generates multiple fragments defined by separator characters that the user enters in the separator field. The separator characters preferably are included in the fragment. A fragment is defined as the entire line containing the separator, up to the next line containing the same separator. If the separator does not appear in the first line, then first fragment contains the line(s) up to the first line containing the separator. This option enables the user to access any number of lines between two separators.

The switch option enables the user to define multiple keywords, or conditions, for a single text fragment. Every keyword defined preferably has its own container that receives data only if a specific condition is satisfied, i.e. true. If none of the conditions is satisfied, then preferably the specific fragment is mapped to a "default" container. The switch option is useful hen individual elements of a file are to be separated out and made map-able.

The node option enables the user to add a new hierarchical level to the transformation and any associated XML tree structures. The data that the following node/container contains is passed on as is.

The ignore option enables the user to suppress an output of a specific text fragment. Thus, the container and any data is may contain will not be made available as a map-able item in the transformation.

The store as CSV (separated) option enables the user to interpret text fragments as CSV text, and to map individual columns. The Sample Text pane provides an overview of the current CSV fragment, and also enables the user to specify individual field names and field types. Each column preferably appears as a map-able item in the transformation. Container default settings are record separator (CR LF), field separator (,), quote character ("), escape character (none), and first row contains field names (no).

The store as FLF (delimited) option enables the user to interpret text fragments as fixed length text, and to map individual columns in an XML mapping tool. The sample text pane provides an overview of a current FLF fragment and enables the designer to specify field names, lengths and widths. Each column preferably appears as a map-able item in a text component.

The store value option enables the user to define a container, which then makes its data available as a map-able item in an XML mapping. If the user does not change the container name, then the map-able item appears with a given name, e.g., "Store."

Figure 5:
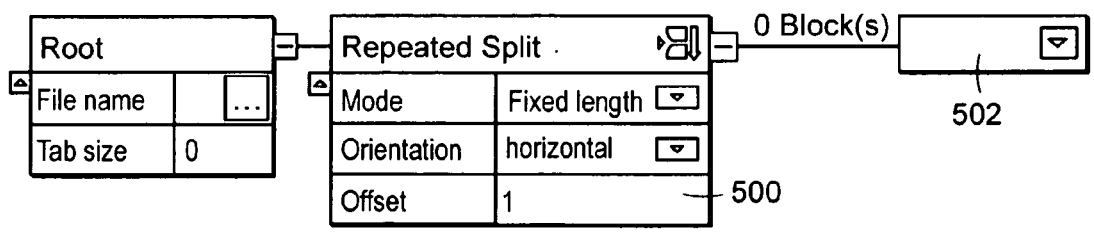
FIG. 5 illustrates how a container is modified when the user selects a container option from the container menu.

When the user selects a container option from the container menu, preferably a number of events occur as illustrated in FIG. 5: the container 500 changes appearance, type and icon (e.g. "Repeated split" appear in the title bar); a set of default operations are visible, e.g.: mode=fixed length, Orientation=horizontal and Offset=1; and, a new container 502 is automatically appended to the current one. As the user generates additional modifications to the legacy text file, one or more additional containers typically are opened, as will be seen. Text within a given container may be further segmented, re-formatted or associated with given conditions (e.g., ignore). Preferably, the overview pane illustrates the containers and their relationships continuously as the design process is carried out.

Figure 6:
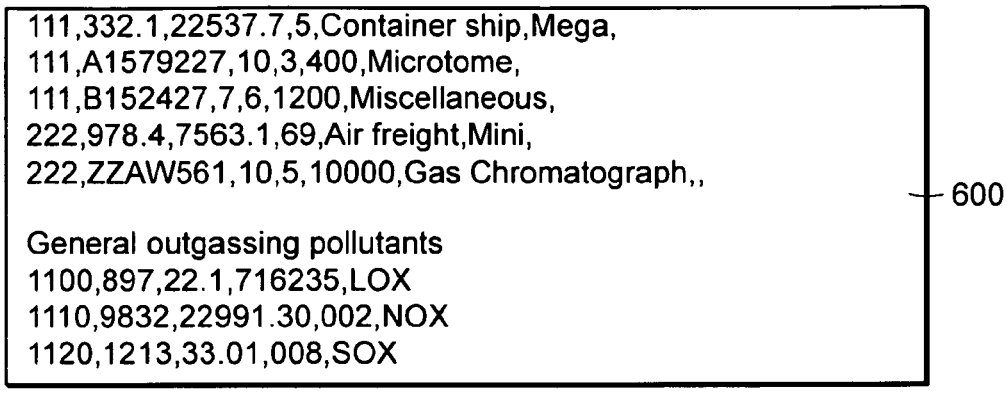
FIG. 6 is a representative legacy text file that is processed by a graphical tool.
Figure 7:
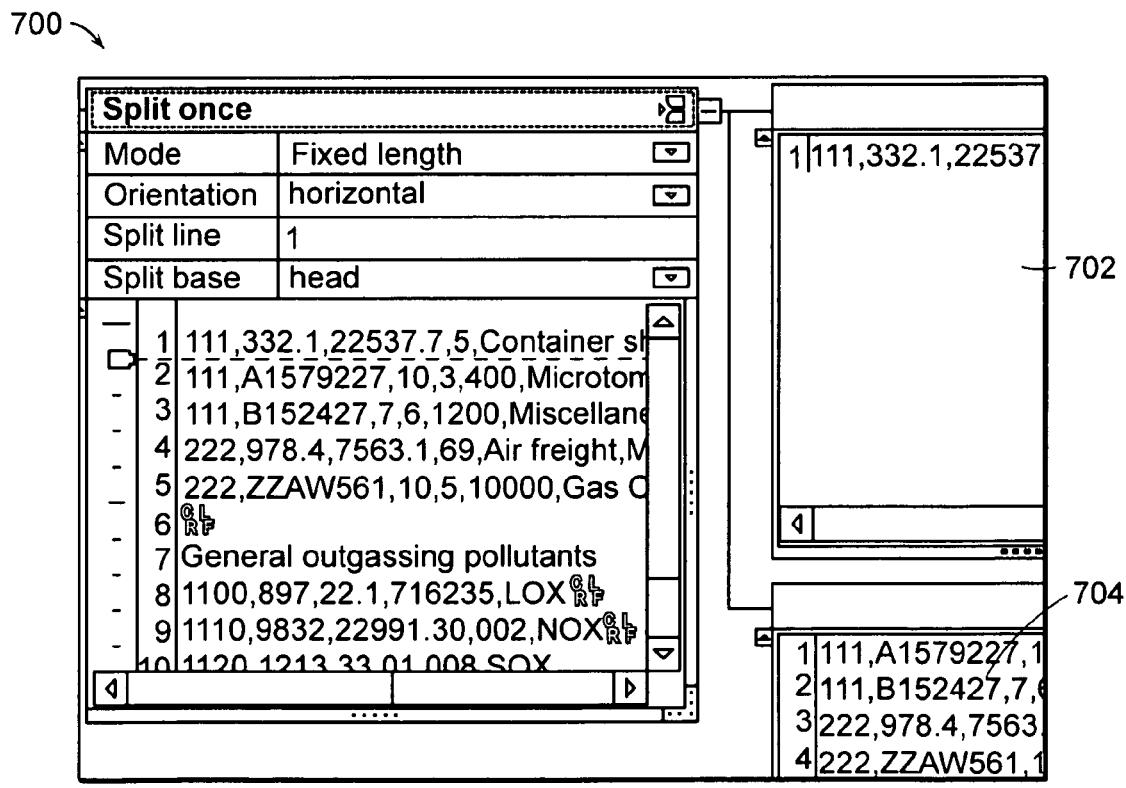
FIG. 7 illustrates how the text file in FIG. 6 is initially processed.

For convenience, this editing process is first described and illustrated by way of example. For illustration purposes only, FIG. 6 is a representative legacy text file 600 that will now be shown as being processed by the inventive graphical tool. In particular, the functions afforded by the various container objects will now be described with reference to this text file. It is assumed that the design project involves separating out the records that are associated with the keys 111 and 222, discarding the plain text record, and generating a CSV file of the remaining records. The following illustrates one way of achieving this result using the visual tool. The sequence of steps is merely illustrative and should not be construed as limiting.

Figure 8:
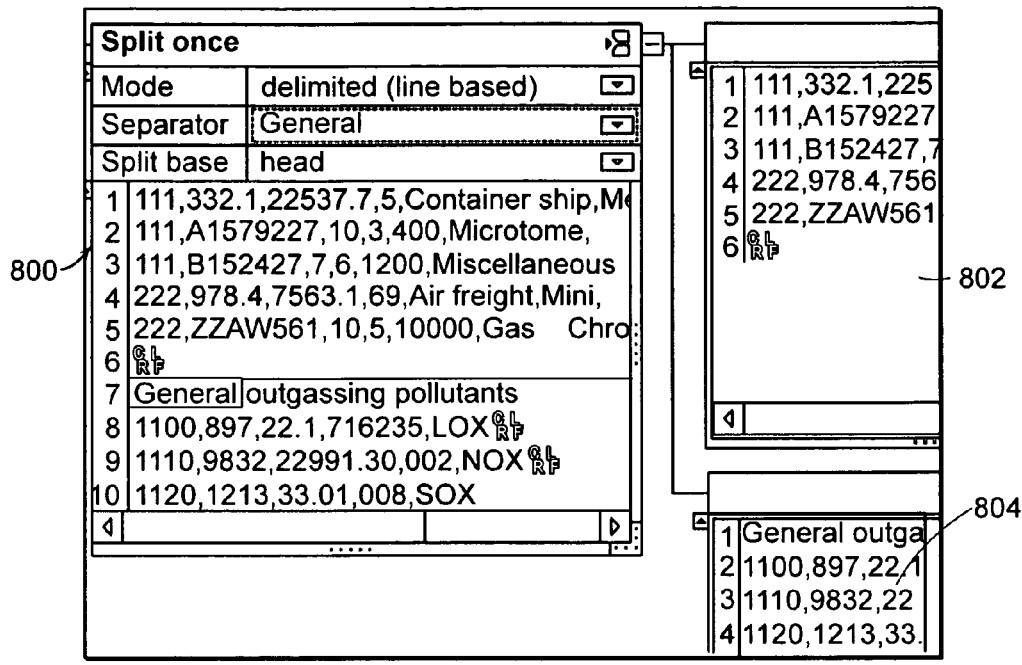
FIG. 8 illustrates a user segmenting the text that has resulted from the "split once" option shown in FIG. 7.

Once the text file (corresponding to FIG. 6) is open in the tool, the user clicks on the container and, in this example, selects the "split once" option. As a result, a split once container 700 is displayed together with two new containers 702 and 704. As noted above, a default action when a given container is selected is to generate one or more "child" containers. A set of default settings for the split once container 700 also are shown, namely, fixed length, horizontal and split line=1. Given these default settings, a top line of the file (highlighted in the split once container 700) is displayed in the top (child) container 702, while a lower (child) container contains the rest of the text file. The references to "top" or "bottom" here are not meant to be limiting, as the orientation can be changed. By using various menu tools, the user can then further segment text, as will now be seen. For example, if the user desires to move the "General" text into the lower container, he or she changes the first field (from fixed length) to delimited (line based) using the mode drop down list; the user then double-clicks the separator field in the separator drop down list and enters "General." As a result, and as illustrated in FIG. 8, a text fragment up to the separator is then placed in the top container 802, and the lines beginning with "General" are moved to the bottom container 804.

Figure 9:
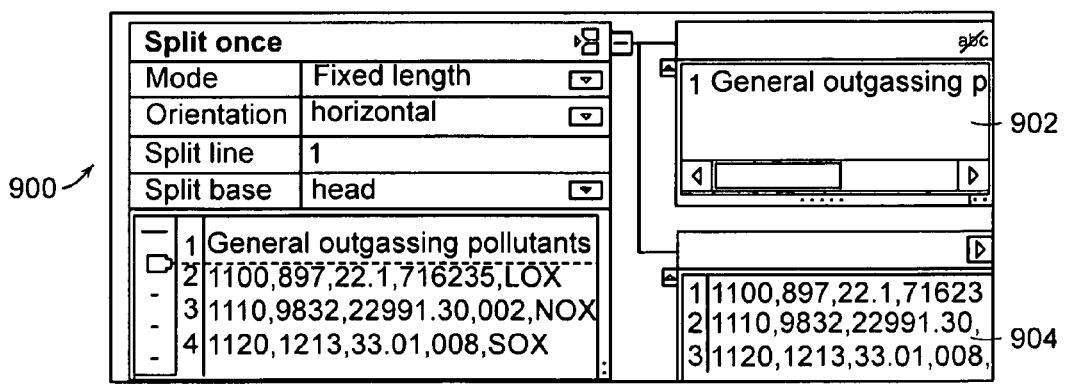
FIG. 9 illustrates how the user can generate a CSV container for given information in the text file.
Figure 10:
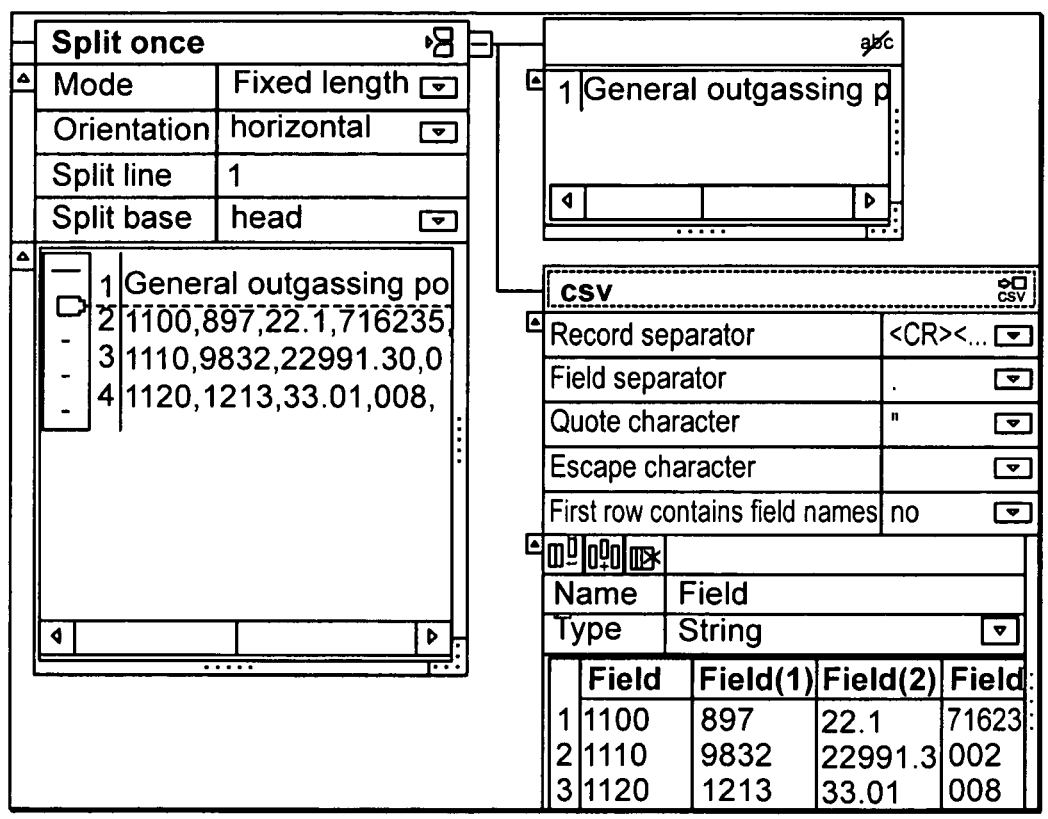
FIG. 10 illustrates the CSV container with the text fragment in a tabular form.

Now, assume that the designer wants to work with the lower container to produce a CSV file containing the records with "1110" and higher. To do so, the designer clicks on the lower container and once again selects the "split once" option. As seen in FIG. 9, what was container 804 in FIG. 8 is now container 900, and this action further generates two new (child) containers 902 and 904. Moreover, and as a result of the default settings as shown, the first line ends up in the top container 902 while the rest of the text ends up in the bottom container 904. Now, assume that the first line is to be ignored because, for example, it is a legacy descriptor that is not needed going forward. This result is achieved by clicking the top container and then selecting an "ignore" function from the container object menu. This text is then no longer available to be processed (into an external file or otherwise). To generate a CSV file, the user selects the bottom container 904 and selects a "store as CSV" option. As a result, and as illustrated in FIG. 10, the container then shows the text fragment in a tabular form with a set of default settings as indicated. If the user desires to change the field names, he or she clicks the field in the table and then changes the entry in the "name" field. If desired, columns can be appended, inserted and deleted.

Figure 11:
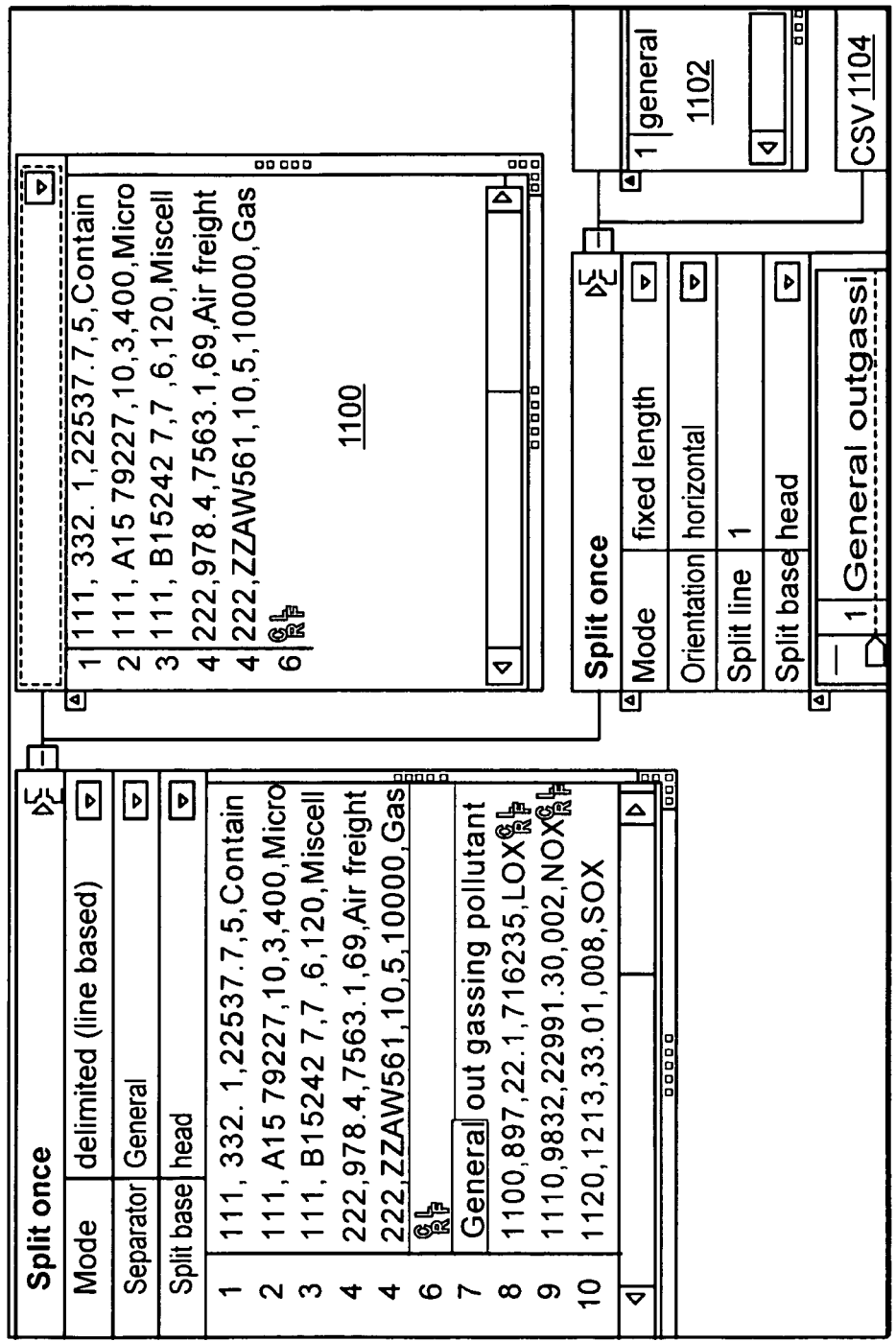
FIG. 11 illustrates a current state of the text file transformation following the operations in FIGS. 7-10.
Figure 12:
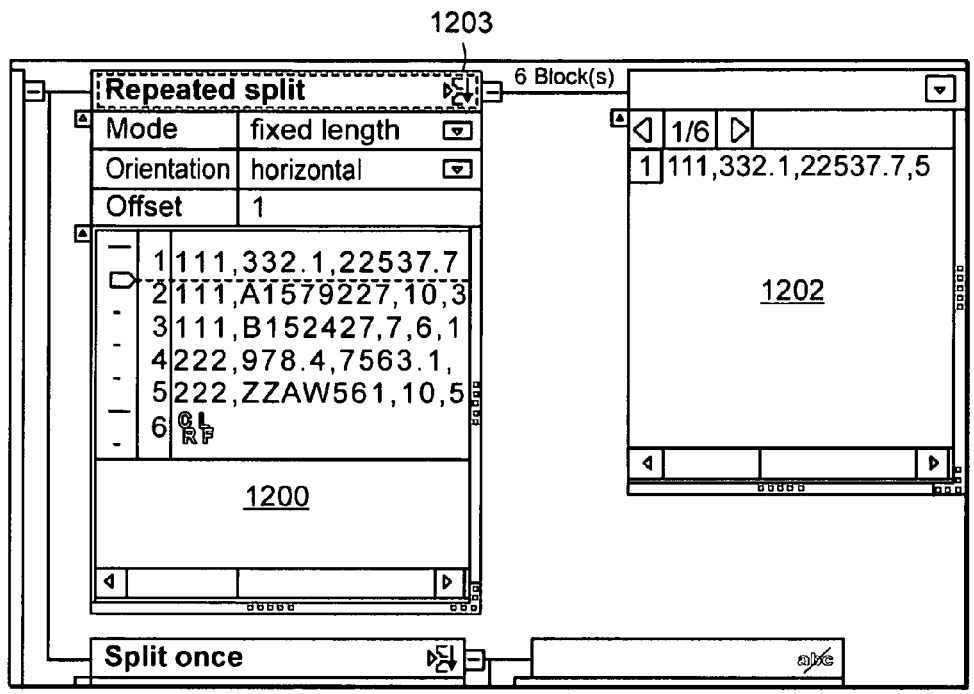
FIG. 12 illustrates the repeated split operation.

A "switch" container object can be used to define multiple conditions per text fragment, as will now be described. As will be seen, this function automatically allocates a container to each condition that is defined. As illustrated in FIG. 11, the current state of the example is that the lower text fragment of the first split once container has been defined. In particular, a split once container has split off the first line into an ignore container 1102, and the remaining information has been defined/stored as a CSV file in container 1104. Now, assume the designer wants to define multiple conditions on the upper portion of the original file. To this end, he or she clicks container 1100 and selects a "repeated split" container option from the menu. As a result, and as seen in FIG. 12, given the default settings the text fragment in container 1200 is split into multiple text blocks of a single line each. The first line is illustrated in the container 1202. The user can select a next text block icon 1203 to cycle through the various text lines (each in its own instance of the container).

Figure 13:
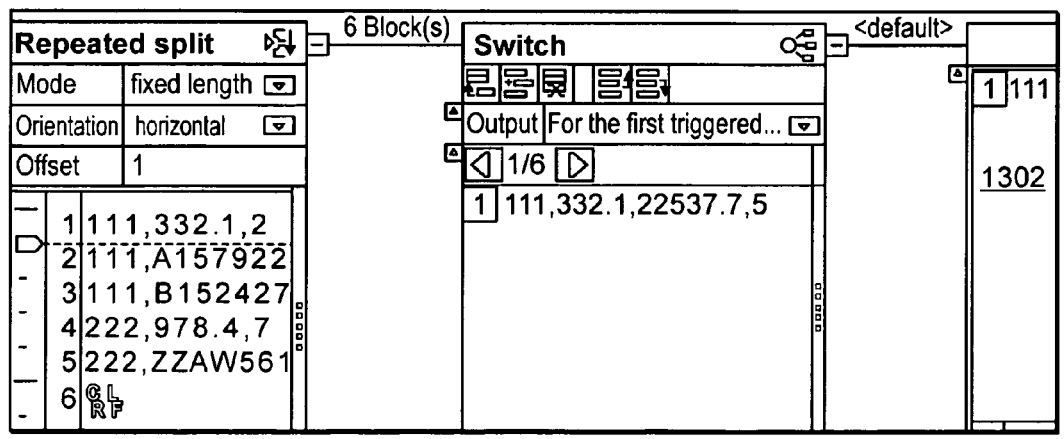
FIG. 13 illustrates the switch operation.
Figure 14:
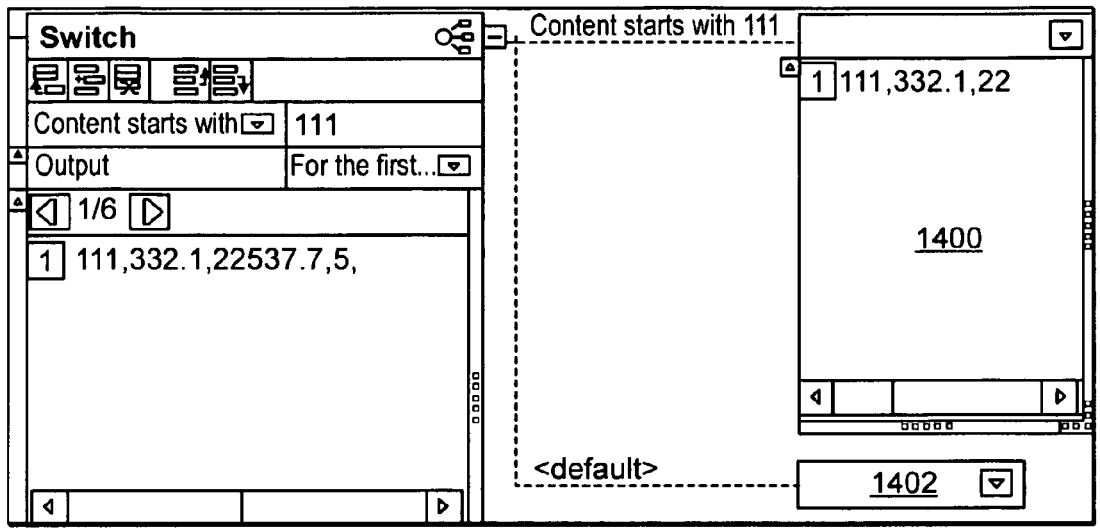
FIG. 14 illustrates the switch operation of FIG. 13 following a given first action.
Figure 15:
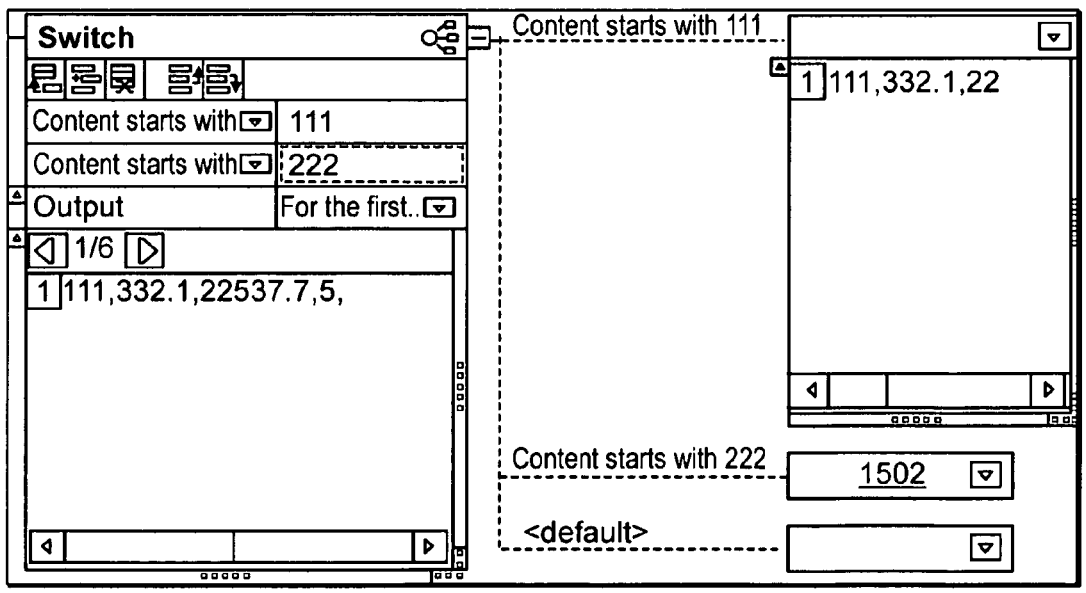
FIG. 15 illustrates the switch operation of FIG. 14 following a given second action.
Figure 16:
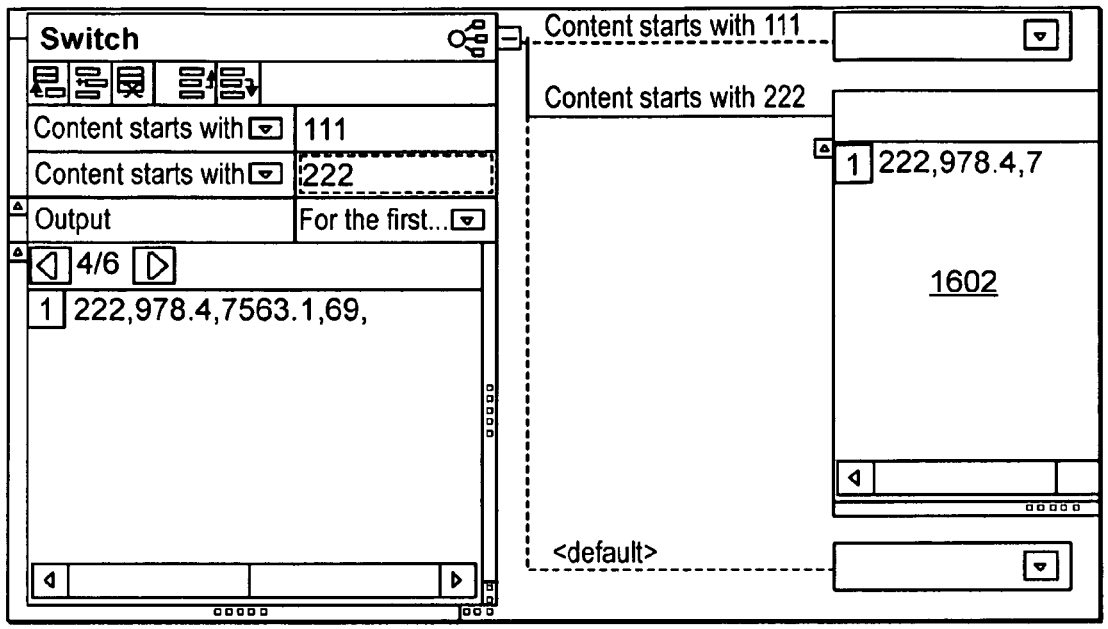
FIG. 16 illustrates the switch operation when a given data record is reached.
Figure 17:
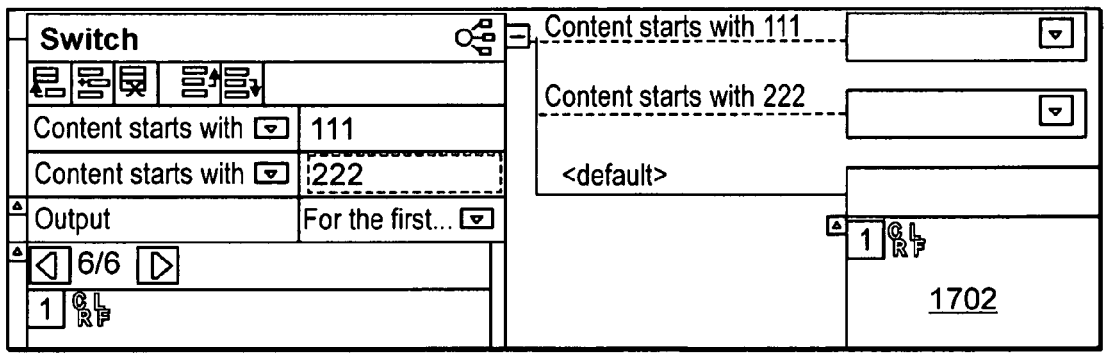
FIG. 17 illustrates the switch operation with another data record is reached.

Now, by clicking the individual line container and selecting "switch" from the container menu, a switch container 1302 is opened, as illustrated in FIG. 13. The contents (namely, the first record) of the container from which the "switch" is launched are displayed. To add a new condition, the user then selects an append condition icon 2402 in the title bar. As a result, and as seen in FIG. 14, an associated container 1400 (with the content starts at "111") is opened together with a default container 1402. If the user then clicks the append icon again and enters "222" in the "content starts with" field, a third container 1502 (the content starts with "222") is added as illustrated in FIG. 15. Thus, by clicking the "content starts with" box, the user can select a "contains" option from which he or she can specify a "string" that can occur anywhere in the text fragment. The user can then click the "next text block" icon several times to see the effect. Upon reaching record 4 of 6, container 1602 opens up (as it has been reached) and displays its contents. This is illustrated in FIG. 16. When record 6 is reached, a single CR/LF character is displayed in the default container 1702 as illustrated in FIG. 17. During this operation, if a data fragment in the current block satisfies a condition, then the complete data of that block is passed on to the associated container. Data is not split up in any way, it is just routed to the associated container, or to the default container if it does not satisfy any of the defined conditions.

Figure 18:
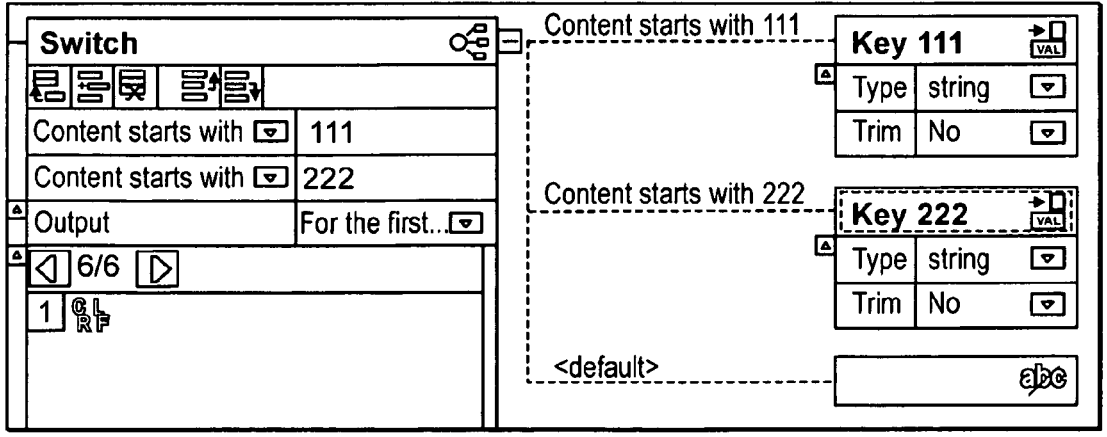
FIG. 18 illustrates the store as value operation.

In particular, and continuing with the example, assume now that the user clicks the first two containers and changes them to "store as value" containers. Further, assume that the user clicks a "store" text and adds the descriptive text "Key 111" and "Key 222" is the respective containers. It is also assumed that the user clicks the third container (which is not needed) and changes it to an ignore container. The result is shown in FIG. 18.

The following description provides additional details as to how to store text fragments as CSV text. The split once container is first used to generate two containers. In particular, the delimited (line based) function with the separator is used to achieve this. In this case, all records up to the first occurrence of the separator are passed to the CSV container. The first container, including all records containing 111, is then defined as a CSV container. A text pane shows the contents of the currently active container "split once." Clicking the CSV container shows its contents in tabular form. In this case, the second container holds the remaining data, and it is then made into another "split once" container. This generates two more containers, one of which will be the second CSV. Clicking the Split once container, shows the current contents.

Now, assume that the delimited (line based) function, using a separator, is used to split the remaining data into two sections. In this example, all records up to the first occurrence of the separator are passed to the first container, which is then set to be non-mapped using the ignore function. The second container is then defined as CSV. The default settings have not been changed. Clicking the CSV container shows the contents in tabular form. This completes the processing.

The above examples, of course, are merely representative as to the how the various container objects can be used perform one or more configurable operations to extract, fragment, ignore and/or re-format given portions of the text file while discarding other non-relevant text, characters or white space. During this processing, each of the container objects and their relationships preferably are shown in the overview pane to facilitate navigation through the text file transformation.

As noted above, given a legacy text file, the graphical tool is used (through one or more visual editing operations provided by the containers) to generate a FlexText configuration file, which describes the structure of the text file. That file may then be used as part of a set of external files for use in a data integration project. The set of external files may be generated in accordance with the techniques described patent application Ser. No. 11/125,532.

The above description is exemplary of a tool used in another mapping tool. In other examples, the tool can be used to directly produce extensible markup language (XML) files. Further, the exemplary tool described throughout can operate for both input and output.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method of processing a text file comprising:
in a computer system having at least a processor and a memory, retrieving the text file;
displaying the text file and a tree structure showing processing commands; and
performing a set of visual editing operations to extract given portions of the text file while discarding other text, characters or white space, the displayed tree structure updated to include all processing commands representative of the visual editing operations used to parse the text file, the set of visual editing operations including a first operation that splits off a fragment of the text file.

2. The method of claim 1 further comprising previewing results of the editing operations using the displayed processing commands in the tree structure.

3. The method of claim 1 further comprising debugging the editing operations using the displayed processing commands in the tree structure.

4. The method of claim 1 wherein the set of visual editing operations includes a second operation that splits off repeating fragments of the text file.

5. The method of claim 4 wherein the set of visual editing operations includes a third operation that identifies a fragment of the text file that is to be ignored.

6. The method of claim 5 wherein the set of visual editing operations includes a fourth operation that identifies a fragment of the text file as belonging to a given data hierarchy.

7. The method of claim 6 wherein the set of visual editing operations includes a fifth operation that enables a set of one or more conditions to be associated with a given fragment of the text file.

8. The method of claim 7 wherein the set of visual editing operations includes a sixth operation that enables a fragment of the text file to be extracted in a given format.

9. The method of claim 8 wherein the given format is one of comma separated value (CSV) or fixed length field (FLF).

10. The method of claim 8 wherein the set of visual editing operations includes a seventh operation that associates a fragment of the text file as a map-able object.

11. The method of claim 1 wherein the displayed tree structure of processing commands is stored in a template or configuration file.

12. The method of claim 11 wherein the template or configuration file is used in a mapping tool to input text files according to a defined structure.

13. The method of claim 11 wherein the template or configuration file is used in a mapping tool to output text files according to a defined structure.

14. The method of claim 11 wherein the template or configuration file is used to convert an input text file into a structured output document.

15. The method of claim 14 wherein the structured output document is an XML document.

16. A system comprising:
a processor;
a memory, the memory including a graphical user interface (GUI) enabling interactive visual restructuring of a displayed text file into a modified text file with a set of visual editing commands while concurrently displaying a tree structure including processing commands representative of the editing commands, the set of visual editing operations used to parse the text file and including an operation that creates a fragment from the text file.

17. The system of claim 16 wherein the set of visual editing operations includes an operation that creates repeated fragments from the text file.

18. The system of claim 16 wherein the set of visual editing operations includes an operation that identifies given characters in the text file that are to be excluded from the modified text file.

19. The system of claim 16 wherein the set of visual editing operations includes an operation that reformats a given fragment from the text file for use in a hierarchical data representation.

20. The system of claim 16 wherein the set of visual editing operations includes an operation that associates multiple conditions to a block of text in the text file.

21. The system of claim 16 wherein the set of visual editing operations includes an operation that extracts data from the text file in a comma separate value format.

22. The system of claim 16 wherein the set of visual editing operations includes an operation that extracts data from the text file in a fixed length field format.

23. The system of claim 16 wherein the graphical interface includes a display portion in which an aggregate representation of the visual editing operations is displayed.

24. A computer program product, tangibly stored on a non transitory machine readable storage device, for displaying, comprising instructions operable to cause a programmable processor to:
display a text file in a parent container object;
responsive to selection of the parent container object, display a menu from which one of a set of actions may be selected;
responsive to selection of one of the set of actions, extract at least a portion of the text file;
generate at least a first child container object that includes the portion of the text file extracted; and
generate at least a second child container object that includes remaining portion of the text file remaining as a result of the extracting.

25. The computer program product of claim 24 further comprising instructions operable to cause the programmable processor to:
responsive to selection of the first or second child container object, display the menu; and
responsive to selection of one of the set of actions, generate and display at least one other container object associated with the first or second child container object.

26. The computer program product of claim 25 further comprising instructions operable to cause the programmable processor to:
display an overview representation of the parent container object and one or more child container objects.

27. A method of processing a text file comprising:
in a computer system having at least a processor and a memory, retrieving the text file;
displaying the text file and a tree structure showing processing commands;
performing a set of visual editing operations to extract given portions of the text file while discarding other text, characters or white space, the displayed tree structure updated to include all processing commands representative of the visual editing operations used to parse the text file, the set of visual editing operations including a first operation that splits off a fragment of the text file; and
previewing results of and/or debugging the editing operations using the displayed processing commands in the tree structure.

28. The method of claim 27 wherein the displayed tree structure of processing commands is stored in a template or configuration file.

29. The method of claim 28 wherein the template or configuration file is used in a mapping tool to input or output text files according to a defined structure.

30. The method of claim 28 wherein the template or configuration file is used to convert an input text file into a structured output document.

31. The method of claim 30 wherein the structured output document is an Extensible Markup Language (XML) document.

32. The method of claim 27 wherein the set of visual editing operations includes second operation that splits off repeating fragments of the text file.

33. The method of claim 27 wherein the set of visual editing operations includes a third operation that identifies a fragment of the text file that is to be ignored.

34. The method of claim 27 wherein the set of visual editing operations includes a fourth operation that identifies a fragment of the text file as belonging to a given data hierarchy.

35. The method of claim 27 wherein the set of visual editing operations includes a fifth operation that enables a set of one or more conditions to be associated with a given fragment of the text file.

36. The method of claim 27 wherein the set of visual editing operations includes a sixth operation that enables a fragment of the text file to be extracted in a given format.

37. The method of claim 36 wherein the given format is one of comma separated value (CSV) or fixed length field (FLF).

38. The method of claim 27 wherein the set of visual editing operations includes a seventh operation that associates a fragment of the text file as a map-able object.

* * * * *